June 29, 1926.
E. BARNES
1,590,719
SPECTACLE AND LIKE JOINT
Filed Oct. 2, 1922
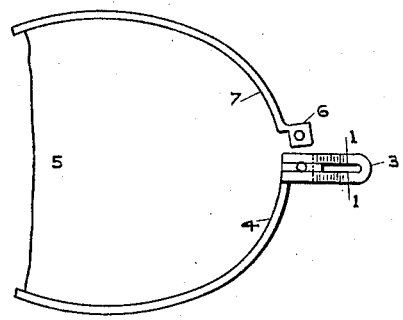
FIG.1.
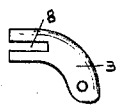
FIG.3.
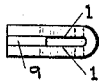  
FIG.4. FIG.5. FIG.6.
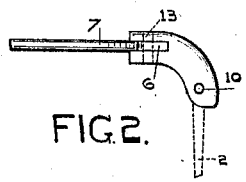
FIG.2.
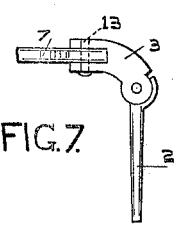
FIG.7.
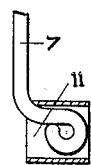 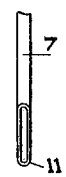 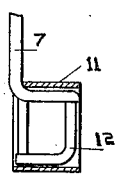 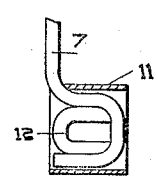
FIG.8. FIG.9. FIG.10. FIG.11.
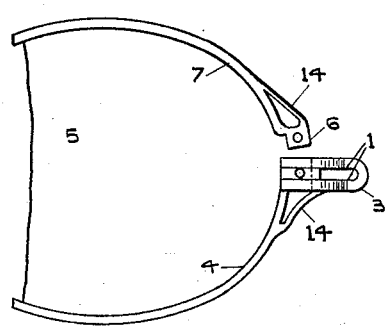
FIG.12.
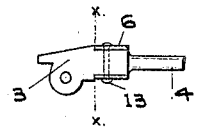 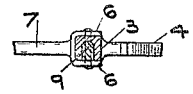
FIG.13. FIG.14.
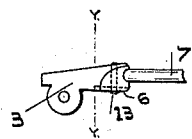 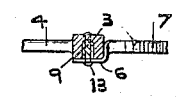
FIG.15. FIG.16.
Inventor
Edwin Barnes
By
Watson, Coit, Morse & Grindle
Attys Patented June 29, 1926.

1,590,719

UNITED STATES PATENT OFFICE.

EDWIN BARNES, OF SHEFFIELD, ENGLAND.

SPECTACLE AND LIKE JOINT.

Application filed October 2, 1922, Serial No. 591,908, and in Great Britain October 19, 1921.

This invention relates to spectacle and eye-glass joints connecting the ends of the eye-wires holding the lens, its object being to provide improvements in the formation of these joints by the employment of which greater accuracy and strength are obtained, and various other advantages are derived such as in ease of re-glazing and in preserving the original accuracy of the whole fitting.

In the usual form of spectacle or eye-glass joint projections are formed at both ends of the eye-wire and they are drawn together and secured with a clamping screw in a plane parallel to that of the lens. According to the present invention, however, a bracket is secured to one end of the eye-wire around the lens and a projection is formed on the other end of the eye-wire and is locked to the bracket by a screw or pin in a plane transverse to that of the lens. In the case of spectacles the bracket may be provided with means for pivoting the side thereto. In the usual form of spectacle joint two parallel surfaces are provided at approximately right angles to the plane of the lens between which the side or temple is pivoted, one of these surfaces being provided on each of the two projections hereinbefore referred to as forming the joint. As a result when the joint is fitted with the lens in position it is found that the surfaces are often not parallel and a badly fitting joint ensues. Although this is perhaps the most usual form of construction, various other forms of joint and of side pivoting have been proposed, as for example, both ends of the eye-wire have been bent outwards and clamped between a piece of sheet metal shaped to provide also surfaces between which the side might be pivoted. In such cases, however, it has been necessary to disturb these parallel surfaces in operations subsequent to their formation, and especially in re-glazing whilst it has always been difficult to make them without introducing weaknesses and inaccuracies.

According to another feature of the present invention the two parallel surfaces at approximately right angles to the plane of the lens between which the side or temple is pivoted are both provided integral with the bracket referred to above as forming part of the joint according to the present invention, preferably a recess or slot is made in the bracket, the projection engaging it by movement parallel to the plane of the lens. The transverse screw or pin is conveniently at about a right angle to the plane of the lens and the projection in the same plane as the eye-wire.

The bracket is preferably formed of sheet metal folded to provide the parallel surfaces, a filling piece being conveniently employed at the eye-wire end of the fold to assist in securing the bracket to the eye-wire and in the formation of the recess or slot, to strengthen the construction and to facilitate the locking of the projection in the recess by means of the transverse screw or pin. The projection preferably comprises a part integral with the eye-wire formed by bending the latter and a casing may be fitted around the projection which may be further solidified by soldering, brazing or like process.

A spectacle joint according to the present invention may be provided with additional support for the bracket or for the projection or for both by strengthening pieces extending from these parts and soldered, brazed or otherwise secured to a part of the eye-wire somewhat removed from the bracket or projection.

In the accompanying drawings:—

Figure 1 is an elevation of one side of a pair of spectacles showing the two ends of the eye-wire provided with means for making a joint according to the present invention.

Figure 2 is a plan of Figure 1.
Figure 3 is a plan view of a detail.
Figure 4 is an elevation of Figure 3.
Figure 5 is an end view of Figure 4.
Figure 6 is a view similar to Figure 5 illustrating a slight modification.
Figure 7 is a view similar to Figure 2 illustrating a modification.
Figure 8 is an enlarged elevation of a detail, and Figure 9 is an end view of Figure 8.
Figures 10 and 11 are views similar to Figure 8 illustrating modifications.
Figure 12 is a view similar to Figure 1 illustrating a modification.
Figure 13 is a plan of a modified form of joint according to the present invention.
Figure 14 is a sectional edge view of Figure 13 on the line $x$—$x$ thereof.
Figure 15 is a view similar to Figure 13 illustrating a further modification, and Figure 16 is a sectional edge view of Figure 15 on the line y—y thereof.

Like reference numerals indicate like parts throughout the drawings.

In carrying out the present invention as applied to spectacles the two parallel surfaces 1 between which the side or temple 2 is pivoted are both provided on a single bracket 3 which is secured to one end 4 of the eye-wire which surrounds the lens 5. A projection 6 is provided at the other end 7 of the eye-wire and means are furnished for locking it to the bracket 3.

The bracket 3 is preferably formed of sheet metal folded to provide the parallel surfaces 1 as shown in Figures 1 to 6. In the construction illustrated in these figures the bracket 3 is provided with a recess 8 for engagement of the projection 6. Conveniently this recess is made in the form of a slot as shown in Figure 3, the end 4 of the eye-wire being inserted into the end of the slot 8 to facilitate the attachment of the bracket to the eye-wire by a brazing, soldering or like operation. A filling piece 9 (Figures 4 and 5) may be inserted at the eye-wire end of the bracket 3 to facilitate manufacture. The filling piece 9 may be partially cut away by the formation of the slot 8, but otherwise it would serve to solidify the sheet-metal bracket at the eye-wire end thereof and generally to strengthen the construction. If desired the filling piece 9 may be omitted in some cases, the bracket 3 being shown without it in Figures 1 and 6. It will of course be appreciated that the bracket 3 is attached to the end 4 of the eye-wire in such manner that the parallel surfaces 1 are at the desired angle (usually approximately a right angle) to the plane of the lens 5.

As shown in the construction illustrated in Figures 2 and 3 the bracket 3 may be curved so that the part where it is folded to produce the parallel surfaces 1 will serve as a stop limiting the outward movement of the temple or side 2 about its pivot 10. If desired, however, this curvature of the bracket may be less pronounced as shown in Figure 7, or altogether omitted as shown in Figures 13 and 15, the stop limiting the outward movement of the temple or side 2 being provided in the usual manner as indicated in Figure 7.

The projection 6 preferably comprises a part integral with the end 7 of the eye-wire carrying the projection. In the form shown in Figures 8 and 9 the projection 6 is formed by bending and flattening the extreme end of the eye-wire and by enclosing it in a casing 11, the projection being further solidified by a soldering, brazing or like process. In the construction shown in Figures 10 and 11 an additional piece 12 is soldered or brazed to the bent end of the eye-wire. The projection 6 is preferably situated in the plane of the lens 5, the recess or slot 8 being, of course, in the same plane.

To fit a joint according to the present invention it is only necessary to bring the projection 6 into the recess 8 and to secure it there by a screw or pin 13 in a plane transverse to that of the lens 5 and engaging a hole in the projection 6. The screw 13 is preferably, but not necessarily, at about a right angle to the plane of the lens. The employment of the filling piece 9 will facilitate the making of the necessary hole in the bracket 3 for the transverse screw 13 and will enable the parts to be fitted more rigidly.

Figure 12 illustrates a modification in which both the bracket 3 and the projection 6 are provided with additional support by means of strengthening pieces 14 extending from these parts and soldered, brazed or otherwise secured to an adjacent part of the eye-wire somewhat removed from the bracket or projection.

In the construction illustrated in Figures 13 and 14 the projection 6 is saddle-shaped and embraces the bracket 3, whilst in the form shown in Figures 15 and 16 the projection 6 is secured to one side only of the bracket 3. In all the forms shown, however, it will be appreciated that the engagement of the projection 6 with the bracket 3 is effected by movement parallel to the plane of the lens 5.

In the case of eye-glasses or otherwise when it is not desired to pivot a side or temple between the surfaces 1, the bracket 3 may be made without these surfaces or they or their equivalent may be arranged parallel to the plane of the lens and be utilized as the recess into which the projection 6 is inserted to be locked by the transverse pin or screw 13.

By the employment of the present invention many advantages are obtained, amongst which may be mentioned the fact that hardened metal may be used for the surfaces 1. For example in the case of gold-filled material the hardness and smooth surface imparted to the metal in the drawing operation of manufacture would be retained in the finished joint. Further, not only is the process of glazing and re-glazing considerably facilitated, whilst the surfaces 1 are not disturbed by any process of manufacture or fitting subsequent to their formation, but the liability to introduce inaccuracies in making or fitting the joint is almost entirely eliminated and an exceptionally strong construction is provided which will have little or no tendency to deteriorate in use.

What I claim is:—

1. In the joint of a spectacle or eye-glass eye-wire adapted to grip the edge of the lens, the combination of a bracket secured to one end of the eye-wire formed of sheet metal folded to provide two parallel surfaces integral with the bracket at approximately right angles to the plane of the lens, means for pivoting a side between those parallel surfaces, a projection on the other end of the eye-wire and a securing member adapted to engage both the bracket and the projection in a plane substantially at right angles to that of the lens, substantially as specified.

2. In the joint of a spectacle or eye-glass eye-wire adapted to grip the edge of the lens, the combination of a bracket secured to one end of the eye-wire formed of sheet metal folded to provide two parallel surfaces integral with the bracket at approximately right angles to the plane of the lens, a filling piece at the eye-wire end of the fold, means for pivoting a side between those parallel surfaces, a projection on the other end of the eye-wire and a securing member adapted to engage both the bracket and the projection in a plane substantially at right angles to that of the lens, substantially as specified.

3. In the joint of a spectacle or eye-glass eye-wire adapted to grip the edge of the lens, the combination of a bracket secured to one end of the eye-wire, a projection on the other end thereof comprising a part integral with the eye-wire formed by bending the latter with a casing around the projection and a securing member adapted to engage both the bracket and the projection in a plane transverse to that of the lens, substantially as specified.

4. In the joint of a spectacle or eye-glass eye-wire adapted to grip the edge of the lens, the combination of a bracket formed of sheet metal folded to provide two parallel surfaces integral with the bracket at approximately right angles to the plane of the lens, a filling piece at the eye-wire end of the fold, a recess at the eye-wire end of the bracket, means for pivoting a side between such parallel surfaces, a projection on the other end of the eye-wire in the same plane as the eye-wire engaging the recess in the bracket by movement parallel to the plane of the lens comprising a part integral with the eye-wire formed by bending the latter with a casing around the projection and a transverse pin adapted to engage both the bracket and the projection at substantially right angles to the plane of the lens, substantially as specified.

In testimony whereof I hereunto affix my signature.

EDWIN BARNES.